United States Patent Office 3,354,184
Patented Nov. 21, 1967

3,354,184
PROCESS OF MANUFACTURING 16-METHYLENE REICHSTEIN'S COMPOUND S AND INTERMEDIATES OBTAINED THEREIN
Fritz Von Werder, Klaus Bruckner, and Karl-Heinz Bork, Darmstadt, Germany, assignors to E. Merck Aktiengesellschaft, Darmstadt, Germany, a corporation of Germany
No Drawing. Filed May 11, 1960, Ser. No. 28,194
Claims priority, application Germany, May 22, 1959, M 41,596
12 Claims. (Cl. 260—397.4)

The present invention relates to a process for the manufacture of the 16-methylene derivative of compound S (16-methylene-4-pregnene-17α,21-diol-3,20-dione) and its esters and to certain intermediates produced in the course of such process.

The alkylated corticoids have recently gained increasing importance in human medicine. 16-methylene-Reichstein's compound S is related to one group of such alkylated corticoids and is convertible thereinto. Therefore an efficient synthesis for this steroid is of considerable commercial importance.

The present invention provides a technically useful synthesis for 16-methylene-Reichstein's compound S in good yields.

We have found that 16-methylene-Reichstein's compound S may be prepared in 5 steps, starting either from 16α,17α-oxido-16β-methyl-5-pregnene-3β-ol-20-one (I) or from 16-methyl-4,16-pregnadiene-3,20-dione (II). Compound I may be converted by Oppenauer oxidation, and compound II by epoxidation into 16α,17α - oxido - 16β-methyl-4-pregnene-3,20-dione (III). It was surprising that the oxido ring of compound III could be opened by treatment with an acid to form the 16-methylene-4-pregnene-17α-ol-3,20-dione (IV). Compound IV can then be converted into 16-methylene-Reichstein's compound S by introduction of a 21-iodine group, followed by treatment with an alkali metal acetate or hydroxide and subsequent saponification, if desired, of the ester produced by use of the alkali metal organic salt.

According to our invention a method of manufacturing 16-methylene-Reichstein's compound S is provided which comprises the steps of dehydrogenating 16α,17α-oxido-16β-methyl-5-pregnene-3β-ol-20-one (I) by Oppenauer reaction, or reacting 16-methyl-4,16-pregnadiene-3,20-dione (II) with an alkaline solution of $H_2O_2$ or with an organic per-acid, to form in each case 16α,17α-oxido-16β-methyl-4-pregnene-3,20-dione (III); reacting III with an acid in an inert solvent, such as benzene, to form 16-methylene-4-pregnene-17α-ol-3,20-dione (IV); reacting IV with an alkaline solution of iodine to form 21-iodo-16-methylene-4-pregnene-17α-ol-3,20-dione (V); reacting V with an alkali acetate to form 16-methylene-4-pregnene-17α,21-diol-3,20-dione 21-acetate (VI); and saponifying VI, if desired, to obtain 16-methylene-Reichstein's compound S.

The process of the invention is graphically illustrated by the following structural equations:

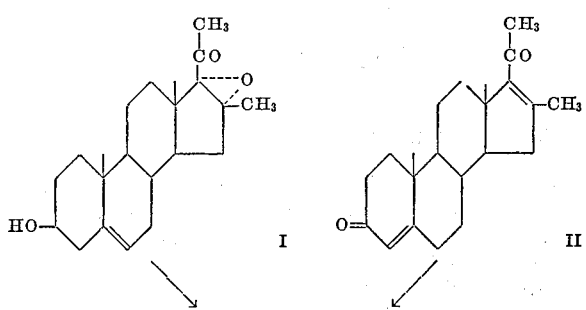

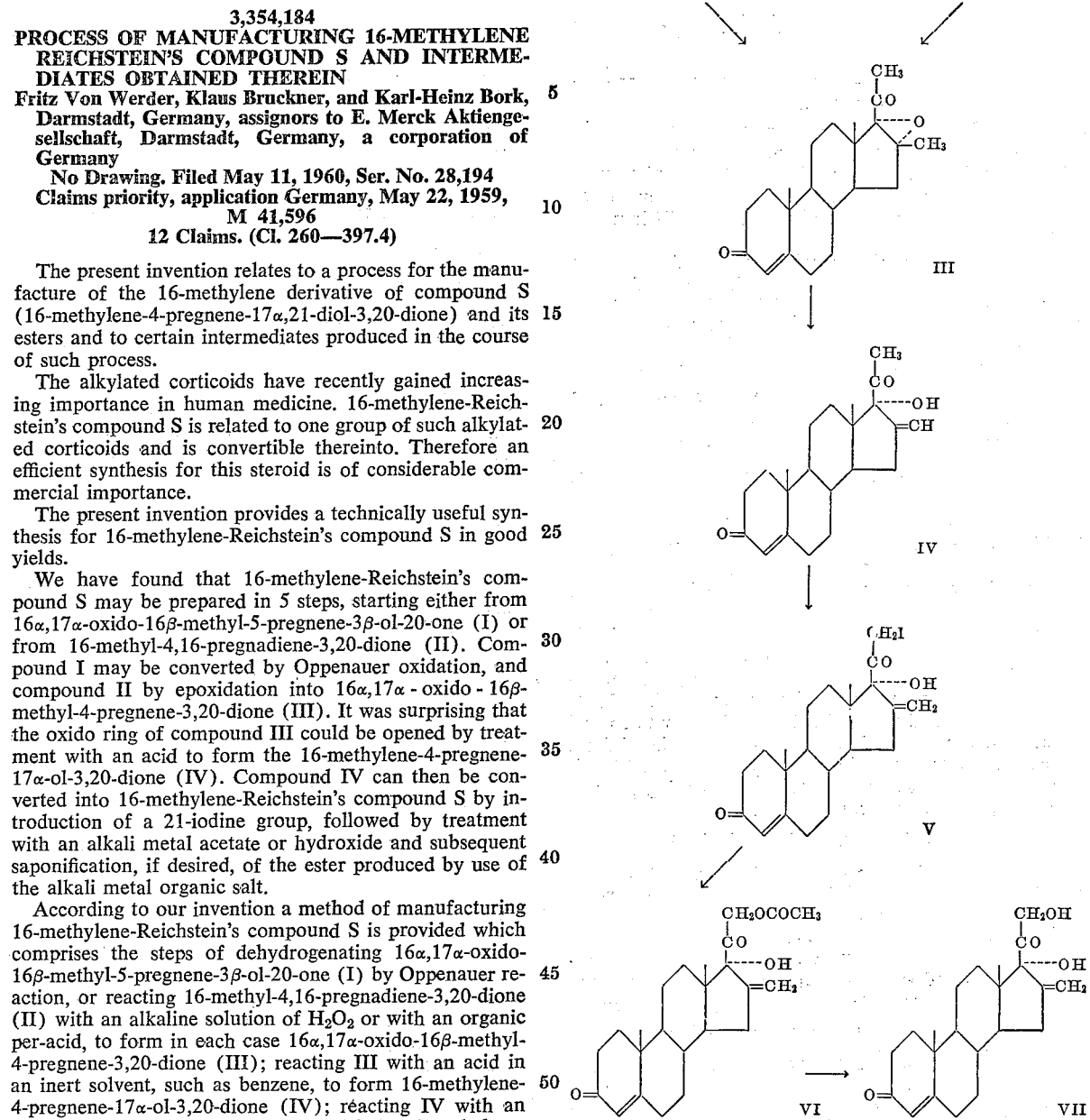

The conversion of the oxido compound I into the ketone III is conducted according to the usual methods of Oppenauer dehydrogenation, for example, by treatment with aluminum isopropylate in a toluene solution containing cyclohexanone.

The diene II may be converted into the oxido compound III, for example, by treatment with a mixture of $H_2O_2$ (30%) and aqueous $K_2CO_3$. The epoxidation of II can also be effected by treatment with peracid, e.g. with an ethereal solution of phthalic monoperoxyacid.

A very important step in the present process is the opening of the oxido ring in compound III by treatment with a preferably strong acid in an inert solvent. Particularly suitable are catalytic amounts of a strong acid, for example, a sulfonic acid, such as p-toluene-sulfonic acid or benzene sulfonic acid. The solvent is preferably benzene. This opening of a 16β-methyl-16,17-oxido steroid resulting in the formation o fa 16-methylene group was surprising and unexpected. The yields of these reactions are good.

The 16-methylene-4-pregnene-17α-ol-3,20-dione (IV) obtained may be converted into the 12-iodide (V) by treatment with an alkaline solution of iodine. The iodine is preferably added in small portions to a solution of compound IV in an inert solvent, such as tetrahydrofuran. Then an aqueous solution of NaOH (10%) is added with stirring until the color of the iodine has disappeared.

By treatment with an alkali acetate the iodide V may be converted into 16-methylene-Reichstein's compound S 21-acetate (VI). This acetylation may be carried out in a solution of acetone with potassium acetate.

The ester VI may be saponified in the usual way to 16-methylene-Reichstein's compound S. The saponification may be carried out in a solution of $KHCO_3$ in methanol.

The starting material, the oxido compound I, may be prepared by treatment of 16-methyl-5,16-pregnadiene-3-ol-20-one 3-acetate (described by Wettstein, Helv. Chim. Acta., vol. 27, p. 1803 (1944) with $H_2O_2$ in an alkaline medium.

The starting compound II may be prepared by addition of diazomethane to 16-dehydroprogesterone and pyrolysis of the pyrazoline derivative obtained.

*Example.—16-methylene compound S*

(A–1) *16β - methyl - 16α,17α - oxido-4-pregnene-3,20-dione.*—From a solution of 50 g. of 16β-methyl-16α,17α-oxido-5-pregnene-3β-ol-20-one (I) (M.P. 185–186°, $(\alpha)_D$ in chloroform=—25°) in a mixture of 400 ml. of cyclohexanone and 2.5 l. of toluene, 400 ml. of the solvent are evaporated at normal pressure. The residue is treated with 50 g. of aluminum isopropylate and refluxed for 2 hours. After treatment with steam the remaining solution is filtered through kieselguhr with suction. The residue in the filter is boiled several times with chloroform. The chloroform extracts are washed with sulfuric acid (3%), $Na_2CO_3$ (3%) and water, dried over $CaCl_2$, filtered and concentrated in vacuo. The residue is recrystallized from methanol. 16β-methyl-16α,17α-oxido-4-pregnene-3,20-dione (III) yields colorless crystals with a melting point of 159–161°, $(\alpha)_D$ in chloroform 151.5°.

$\lambda_{max}$. 240 m$\mu$, $E_{1\,cm.}^{1\%}$ 514 (Alcohol)

(A–2) *16β - methyl - 16α,17α-oxido-4-pregnene-3,20-dione.*—To a solution of 20 g. of 16-methyl-16-dehydroprogesterone (II) in 5 l. of methanol, cooled to 0°, are added 220 ml. of $H_2O_2$ (30%) and a solution of 5.1 g. $K_2CO_3$ in 250 ml. of water. After 8 hours the solution is neutralized with acetic acid, concentrated in vacuo and poured into water. After recrystallization from methanol the 16β-methyl-16α,17a-oxido-4-pregnene-3,20-dione obtained melts at 161°.

(A–3) *16β - methyl - 16α,17α-oxido-4-pregnene-3,20-dione.*—10 g. of 16-methyl-16-dehydroprogesterone are dissolved in 500 ml. of anhydrous chloroform. At —60° C. 1.1 equivalents of an ethereal phthalic monoperoxyacid solution are added. After several hours the solution is heated to 0°, and allowed to stand for 1–2 days at this temperature. The solution is washed with a solution of $FeSO_4$, with water, with a solution of $NaHCO_3$, and finally again with water, dried and evaporated. The residue is recrystallized from methanol. The obtained 16β-methyl-16α,17α-oxido-4-pregnene-3,20-dione (III) melts at 161°.

(B) *16 - methylene - 4-pregnene-17α-ol-3,20-dione.*—34 g. of 16-methyl-16α,17α-oxido-4-pregnene-3,20-dione are dissolved in a mixture of 1.2 l. of benzene. From this solution, 240 ml. of the solvent are evaporated. The residue is treated with 2.4 g. of p-toluene-sulfonic acid and boiled for 6 hours under reflux using a water separator. After cooling, the mixture is washed with a solution of $NaHCO_3$ (5%) and with water and evaporated in vacuo. The residue is washed with a mixture of benzene and low boiling petroleum ether. The crystals are filtered with suction, washed with the same solvent and recrystallized from methanol. The obtained 16-methylene-4-pregnene-17α-ol-3,20-dione (IV) melts at 223°; $(\alpha)_D$ —10.7° (chloroform);

$\lambda_{max}$. 240–241 m$\mu$. $E_{1\,cm.}^{1\%}$ 503

(C) *16 - methylene - 21-iodo-4-pregnene-17α-ol-3,20-dione.*—A solution of 15 g. of 16-methylene-4-pregnene-17α-ol-3,20-dione (IV) in a mixture of 225 ml. of tetrahydrofurane and 38 ml. of methanol is cooled to —4°. With continuous stirring 22.5 g. of iodine are added in small portions taking care that the temperature does not rise above —1°. Then NaOH (10%) is added dropwise until the color of the iodine has disappeared. About 90 ml. of NaOH are required. The solution is poured into 3.5 l. of water, the precipitate is filtered with suction, washed with water and dried in vacuo at room temperature. 16-methylene-21-iodo-4-pregnene-17α-ol-3,20-dione (V) is obtained.

(D) *16-methylene-4-pregnene-17α,21-diol-3,20-dione 21 acetate.*—The crude 21-iodide (V) is refluxed with 880 ml. of anhydrous acetone and 48 g. of potassium acetate for 18 hours. After evaporation of the solvent in vacuo the residue is washed with 500 ml. of water. The undissolved residue is filtered with suction, washed with water, dried and recrystallized from acetone. The 16-methylene-4-pregnene-17α,21-diol-3,20-dione 21-acetate (VI) obtained melts at 162–163°, $(\alpha)_D+52°$ (chloroform).

(E) *16-methylene compound S.*—12 g. of 16-methylene - 4-pregnene-17α,21-diol-3,20-dione-21-acetate (VI) are dissolved in 960 ml. of methanol. 480 ml. of a solution of $KHCO_3$ (5%) are added. The solution is refluxed for three hours and then cooled. Crystals of 16-methylene-Reichstein's compound S separate which are purified by recrystallization from acetone, M.P. 205–207°; $(\alpha)_D+47°$ (chloroform).

$\lambda_{max}$. 240 m$\mu$, $E_{1\,cm.}^{1\%}$ 435

If desired, the diester or mixed diester of compound VII can be prepared in known manner by reacting VI or VII with an acetylating or other acylating agent under the more rigorous conditions required for esterifying the tertiary 17α-hydroxyl group. Thus, the diacetate or mixed acetate-propionate or other combination of ester groups may be introduced into the 16-methylene Compound S.

In place of the direct iodination of the 21-methyl group, such group can first be chlorinated or, preferably, brominated in known manner and the product so obtained then converted to the iodide by treatment with alkali metal iodide, or the chloride or bromide can be heated with the alkali metal hydroxide or organic salt to produce compound VII or VI, respectively.

We claim:
1. The compound

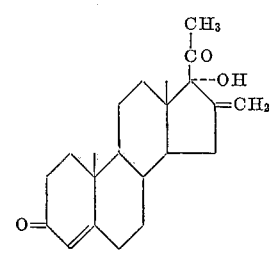

2. In a process for the manufacture of 16-methylene-4-pregnene-17α,21-diol-3,20-dione and its esters, the steps which comprise reacting 16α,17α-oxido-16β-methyl-4-pregnene-3,20-dione with an acid to form 16-methylene-4-pregnene-17α-ol-3,20-dione, halogenating the 21-methyl group, and reacting the product with a member of the group consisting of alkali metal hydroxides and organic salts to produce a member of the group consisting of 16- methylene-4-pregnene-17α,21-diol-3,20-dione and the 21-ester thereof.

3. Process according to claim 2, including the step of dehydrogenating 16α,17α - oxido-16β-methyl-5-pregnene-3β-ol-20-one by an Oppenauer reaction to form the 16α,17α-oxido-16β-methyl-4-pregnene-3,20-dione.

4. Process according to claim 2, including the step of reacting 16-methyl-4,16-pregnadiene-3,20-dione with an alkaline solution of hydrogen peroxide to form the 16α,17α-oxido-16β-methyl-4-pregnene-3,20-dione.

5. Process according to claim 2, including the step of reacting 16-methyl-4,16-pregnadiene-3,20-dione with an organic peracid.

6. Process according to claim 2, wherein the 16α,17α-oxido-16β-methyl-4-pregnene-3,20-dione is heated with p-toluene-sulfonic acid in an inert solvent.

7. Process according to claim 2, wherein the 21-methyl group is halogenated with an alkaline solution of iodine.

8. Process according to claim 2, wherein the halogenated intermediate is reacted with an alkali metal acetate to form the 21-acetoxy derivative.

9. Process according to claim 8, including the step of saponifying the 21-acetate to yield the 16-methylene-4-pregnene-17α,21-diol-3,20-dione.

10. The compound

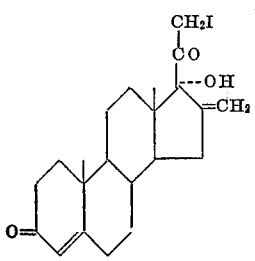

11. The compound

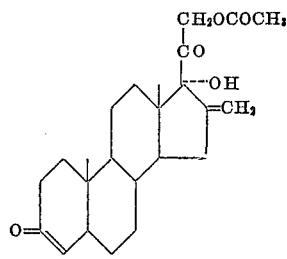

12. A compound selected from the group consisting of a compound of the formula

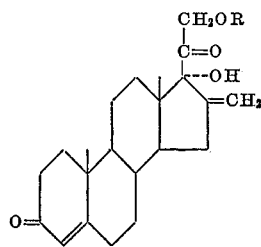

wherein R is selected from the group consisting of H and acetyl.

References Cited
UNITED STATES PATENTS

| | | | |
|---|---|---|---|
| 2,878,247 | 3/1959 | Miramontes et al. | 260—239 |
| 2,686,181 | 8/1954 | Julian et al. | 260—239 |
| 2,932,639 | 4/1960 | Oliveto et al. | 260—239 |
| 3,296,075 | 1/1967 | Kirk et al. | 167—74 |

ELBERT L. ROBERTS, *Primary Examiner.*

L. H. GASTON, M. LIEBMAN, I. MARCUS,
*Examiners.*

H. A. FRENCH, *Assistant Examiner.*